United States Patent Office 3,385,818
Patented May 28, 1968

3,385,818
RIGID POLYVINYL CHLORIDE RESIN COMPOSITIONS HAVING INCREASED RESISTANCE TO HEAT DETERIORATION
Otto S. Kauder, Jamaica, N.Y., assignor to Argus Chemical Corporation, Brooklyn, N.Y., a corporation of New York
No Drawing. Filed Jan. 8, 1962, Ser. No. 164,973
11 Claims. (Cl. 260—45.75)

This invention relates to rigid, i.e. unplasticized, polyvinyl chloride resin compositions containing an organotin compound and at least one compound from the group consisting of bis-phenol monosulfides and hindered phenols and having, as a result, an improved resistance to deterioration when heated at temperatures of 375° F. and higher.

Many organotin compounds are now widely recognized as the best available single-compound stabilizers for polyvinyl chloride resins. Even the best of these, however, is not always satisfactory.

Numerous types of organotin compounds have been proposed for the stabilization of polyvinyl chloride resins, among them, the alkyl tin mercaptides and alkyl tin mercaptoesters described in U.S. Patents Nos. 2,914,506 to Mack, 2,801,258 and 2,891,922 to Johnson, 2,726,254 and 2,870,119 to Leistner, 2,726,27 to Leistner, and 2,641,588 to Leistner, and 2,954,363 to Kuehne; the alkyl tin mercaptoacid ester compounds, described in U.S. Patent No. 2,641,596; the alkyl tin amides of thio acids described in U.S. Patent No. 2,704,756 to Leistner; and the alkyl tin cyclic glycol thio acid esters described in U.S. Patent No. 2,752,325 to Leistner; the alkyl tin xanthates described in U.S. Patent No. 2,759,906 to Leistner; and the alkyl tin esters of mercapto alcohols of U.S. Patents Nos. 2,870,119, 2,870,182, 2,872,468 and 2,883,368 to Leistner et al.

These organotin compounds have in common a hydrocarbon group directly attached to tin through a carbon atom, and a sulfur-containing radical attached to the tin through the sulfur atom. This combination of radicals is recognized as giving optimum stabilization, from the standpoint of clarity and minimizing loss of hydrogen halide from the resin. However, sulfur-containing radicals introduce an odor problem.

Several types of organotin compounds have been suggested in which the tin is not linked to sulfur. These compounds have a hydrocarbon group directly attached to tin through a carbon atom, and an oxygen-containing group, such as an alkoxy or an ester group, attached to tin through oxygen. Typical of these compounds are those described in U.S. Patents Nos. 2,938,013 to Mack et al. and 2,680,107 to Leistner et al. However, the oxygen-containing radicals do not impart as good a stabilizing effect as sulfur radicals.

U.S. Patent No. 2,307,157 to Quattlebaum et al. suggests the use of sulfur-free organotin carboxylates as the sole color-stabilizing agents for vinyl chloride compositions. The results obtained through the use of these compounds alone are not as effective as the results obtained through the use of sulfur-containing compounds. Some modifications have been made in the Quattlebaum type process, such as, for example, the use of compounds such as bis (dibutyltin monolaurate) maleate, a complex compound containing two tin atoms per molecule. Despite modifications, the sulfur-containing compounds are more effective as stabilizers.

Leistner et al. in U.S. Patent No. 2,564,646 disclose the stabilization of polyvinyl chloride resins with metal salts including certain organotin compounds. Anti-clouding agents are also added to the composition. The preferred anti-clouding agents are said to be the organic phosphites. The patentees indicate that when less effective anti-clouding results are acceptable, other anti-clouding agents may be employed such as the hindered phenols and the organic sulfides. The polyvinyl chloride resin compositions contemplated by the Leistner et al. patent are all plasticized compositions. The working examples therein all indicate the use of appreciable amounts of plasticizer. Stabilizers which are effective for plasticized resins are not necessarily satisfactory when used in rigid polyvinyl chloride resin compositions. Rigid compositions by their nature must be processed at substantially higher temperatures than plasticized compositions. Thus, many stabilizers for plasticized resins, although affording adequate stability at lower temperatures are not satisfactory under the more severe conditions. Stabilizers for plasticized resins are conventionally tested at 350° F. whereas rigid resin stabilizers should be effective to prevent deterioration upon heating for one hour at 375° F. The particular stabilizer combinations now found to be effective under the move severe conditions required for rigid polyvinyl chloride resins are not disclosed in the Leistner et al. patent which is more concerned with the lower temperature requirements for stabilization of plasticized resins.

In accordance with the present invention, rigid polyvinyl chloride resins having improved resistance to deterioration when heated at 375° F. for up to one hour are provided comprising an organotin compound free from sulfur, but having as good a stability as polyvinyl chloride resins stabilized with an organotin sulfur-containing compound but with better color retention and less odor. This invention makes use of the beneficial and synergistic stabilizing effect upon polyvinyl chloride of phenol compounds from the group consisting of bisphenol monosulfides and hindered phenols and organotin salts of half esters of unsaturated aliphatic dicarboxylic acids. Thus, the rigid polyvinyl chloride resin compositions of this invention comprise a phenol compound of the types described and an organotin compound having organic radicals linked to tin only through carbon and oxygen, at least two organic radicals being linked through carbon and at least one organic radical being linked through oxygen to a carboxyl group of an unsaturated dicarboxylic acid in which the carboxyl group not linked to the tin atom will have been reacted to form an ester linkage with a suitable monohydric or polyhydric alcohol. The specified phenol compounds alone impart no observable stabilizing effect to unplasticized polyvinyl chloride resins and the organotin half esters are not very effective stabilizers but the two together form a stabilizer composition which is extremely effective even at 375° F. and equal in performance to the conventional sulfur-containing tin compounds but without the disadvantage of extremely unpleasant odor.

The organotin compound can be either monomeric or polymeric but is preferably monomeric. The preferred organotin compounds used in the invention can be further defined by the formula:

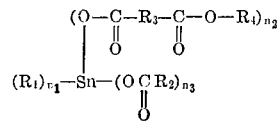

In the above formula, $R_1$ and $R_2$ are hydrocarbon radicals having from about one to about thirty carbon atoms, which can contain inert substituent groups such as halogen, ether and ester groups.

$R_1$ can, for example, be an aliphatic group such as alkyl and alkenyl, cycloaliphatic group such as cycloalkyl and cycloalkenyl, or heterocyclic group, such as methyl, ethyl, propyl, propenyl, isopropyl, n-butyl, butenyl, vinyl, isobutyl, tert-butyl, sec-butyl, amyl, hexyl, octyl, oleyl, 2-ethylhexyl, iso-octyl, lauryl, stearyl, behenyl, allyl, furfuryl, cyclohexyl, cyclopentyl, tetrahydropyranyl and tetrahydrofurfuryl.

The

group can be derived from an organic mono or poly carboxylic acid, saturated or unsaturated, of the formula $R_2COOH$ including aliphatic, aromatic, cycloaliphatic and heterocyclic acids, which can contain inert substituents such as halogen, hydroxyl, keto and alkoxy groups, such as, for example, acetic acid, propionic acid, oleic acid, ricinoleic acid, linoleic acid, stearic acid, butyric acid, valeric acid, chloroacetic acid, hexanoic acid, octanoic acid, lactic acid, levulinic acid, 4-methoxy butyric acid, lauric acid, behenic acid, linoleic acid, palmitic acid, benzoic acid, methylbenzoic acid, cyclohexane carboxylic acid and furoic acid.

$R_3$ is a hydrocarbon group having from about one to about thirty carbon atoms and containing an ethylenic double bond. The ethylenic double bond is located such that in an acid of the formula

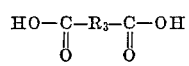

the said double bond is alpha to a carboxyl group. The $R_3$ groups are derived from alpha unsaturated dicarboxylic acids containing from about four to about ten carbon atoms, such as maleic acid, fumaric acid, itaconic acid, glutaconic acid, 2-hydromuconic acid, citraconic acid, 2-hexene-1,4-dicarboxylic acid, 2-octene-1,8-dioic acid, cyclohexene-1,2-dicarboxylic acid and 2,5-heptadienedioic acid.

$R_4$ is an organic group derived from a monohydric or polyhydric alcohol of the formula $R_4-(OH)n_4$ where $n_4$ is an integer from one to about four but is preferably one or two. Thus, $R_4$ can be alkyl, alkylene, alkenyl, aryl, arylene, mixed alkyl-aryl, mixed aryl-alkyl, cycloaliphatic and heterocyclic and can contain from about one to about thirty carbon atoms and can also contain ester groups, alkoxy groups, hydroxyl groups, halogen atoms and other inert substituents. Preferably $R_4$ is derived from dihydric alcohols, such as glycols containing from two to about thirty carbon atoms, including ethylene glycol, propylene glycol, diethylene glycol, dipropylene glycol, tetramethylene glycol, neopentyl glycol and decamethylene glycol or from monohydric alcohols containing from one to about thirty carbon atoms, such as methyl, ethyl, propyl, n-butyl, t-butyl, isobutyl, octyl, decyl and lauryl alcohols.

The sum of $n_1$, $n_2$ and $n_3$ is four, $n_1$ is either two or three, $n_2$ can range from one to two and $n_3$ can range from zero to one. Preferably, $n_2$ is either one or two and $n_3$ is either zero or one.

The following organotin compounds are typical of those coming within the invention:

1. 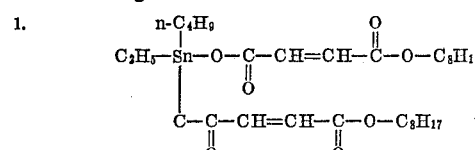

2. 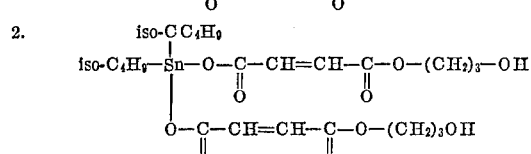

3. 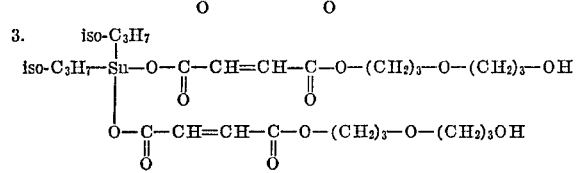

4. 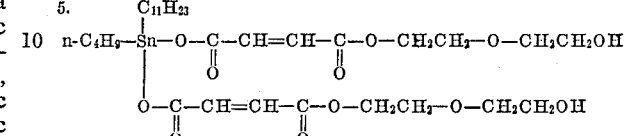

5. 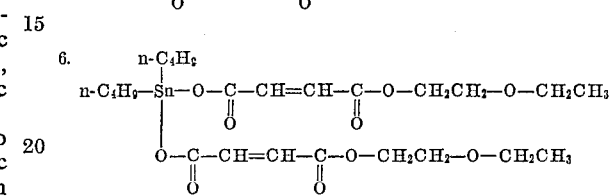

6. 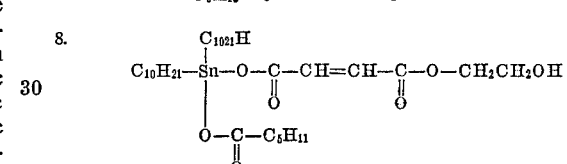

7. 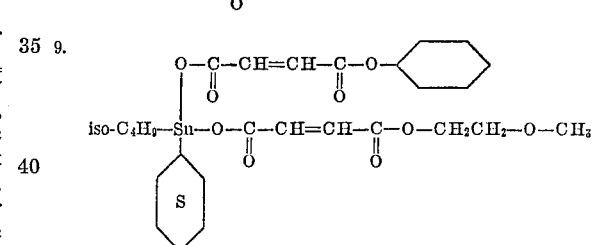

8. 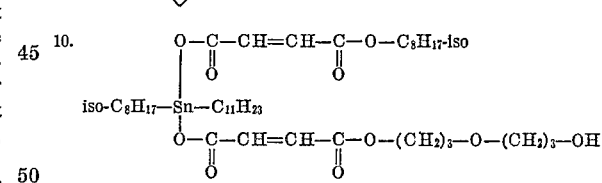

9. 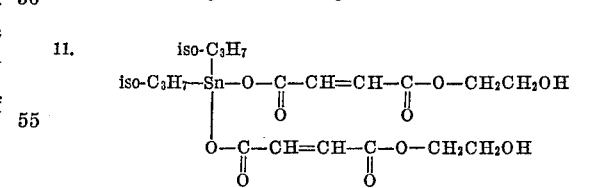

10. 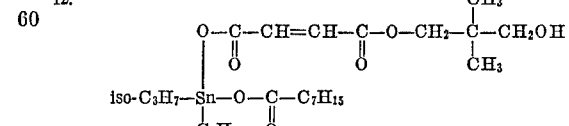

11. 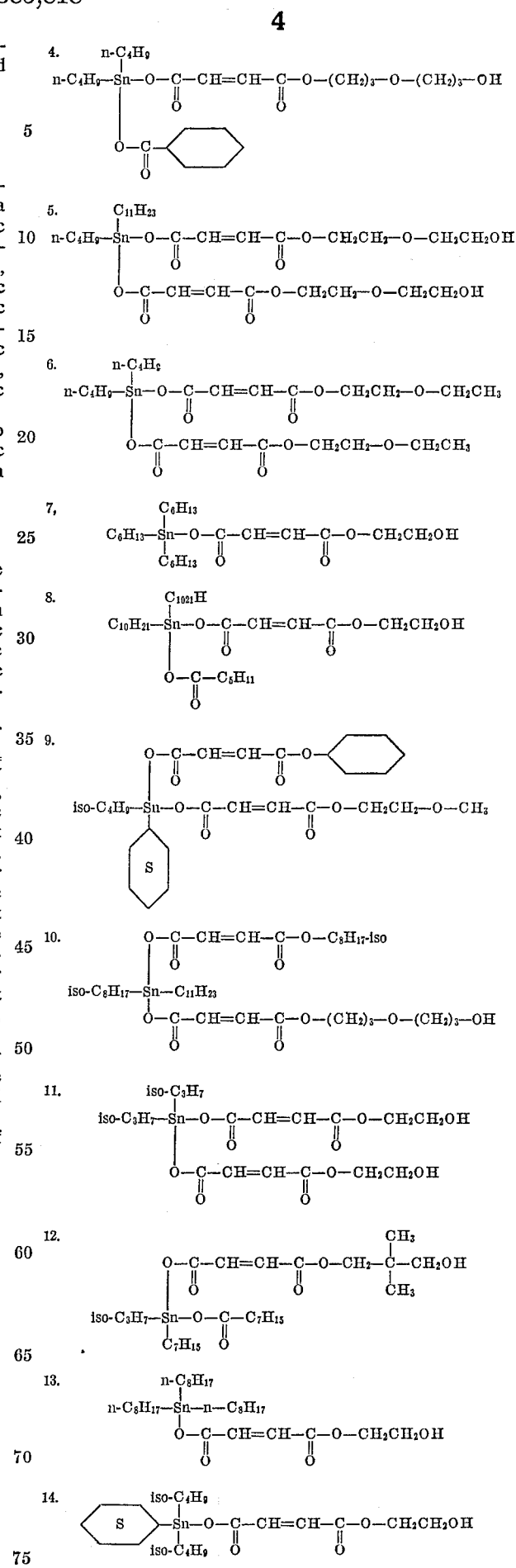

12.

13.

14.

15. 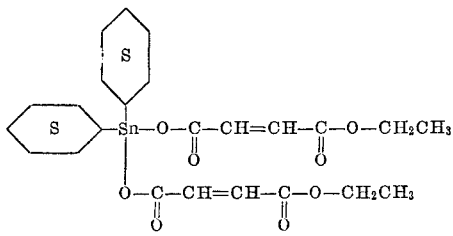

16. 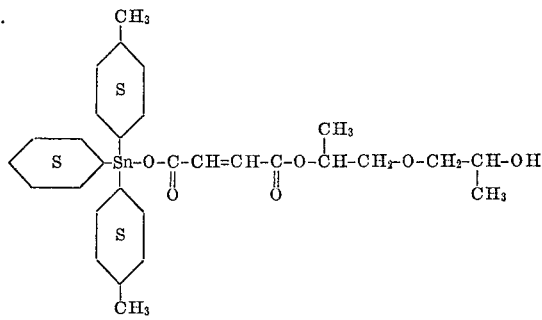

17. 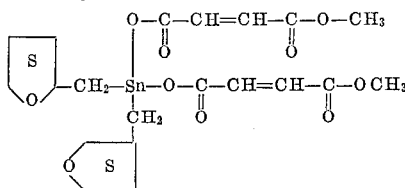

18. 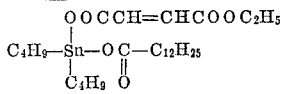

These compounds are readily prepared by conventional methods as by reacting the corresponding organotin oxides with the appropriate organic carboxylic acids. A typical reaction for such a preparation is as follows:

$(R_1)_2Sn=O + 2[HOOC-R_3-COOR_4] \rightarrow$
$(R_1)_2-Sn-[OOC-R_3-COOR_4]_2 + H_2O$ Additional details on the preparation of organotin compounds can be had by reference to the publication, "The Development of the Organotin Stabilizers" by H. Verity Smith (The Tin Research Institute, Middlesex, England, 1959).

The second component of the stabilizing combination of this invention is a sterically hindered phenol compound or a bis-phenol sulfide, not necessarily sterically hindered, in which the phenyl groups are linked to each other through a sulfur atom. The phenomenon of steric hindrance of aromatic compounds, sometimes referred to as the "ortho effect" is well known. See, for example, pages 378–386 of "Advanced Organic Chemistry" by Wheland (second edition, Wiley, 1949). In essence, a compound is said to be hindered and hence exhibits the requisite degree of reactivity for this invention when there are two inert substituent groups ortho to the reactive substituent group, in this case hydroxyl, on an aromatic nucleus. A compound such as 3-methyl-p-cresol would not exhibit steric hindrance with respect to the phenolic hydroxyl group. On the other hand, the compound 6-methyl-o-cresol would be considered to be hindered. The substituents in the position ortho to the hydroxyl group or groups of the phenol compound can be any substituent inert to polyvinyl chloride and to the organotin compound. Such inert substituents include hydrocarbon groups such as aliphatic, cycloaliphatic, aromatic and mixed aliphatic-aromatic hydrocarbon groups, alkoxy groups, acyl groups

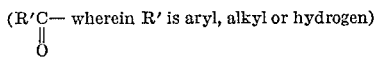

(R'C— wherein R' is aryl, alkyl or hydrogen)

and halogen atoms such as chlorine, bromine and iodine.

The preferred hindered phenol compounds of this invention can be characterized by the formula:

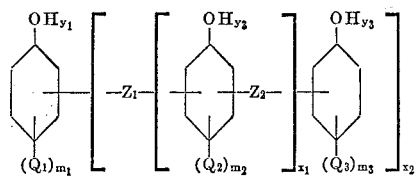

wherein $Q_1$, $Q_2$ and $Q_3$ are each inert substituent groups on the phenyl nucleus; $Z_1$ and $Z_2$ are bivalent linking radicals; $m_1$ is an integer from a minimum of one to a maximum of $5-x_2$, except when $x_2$ is zero, $m_1$ must be at least two; $m_2$ can be an integer from zero to three and $m_3$ an integer from one to four; $x_1$ can be an integer from zero to about six and $x_2$ an integer from zero to five, preferably zero or one. Each phenolic hydroxyl group in the molecule must be hindered, that is, there must be an inert substituent group in each position ortho to a hydroxyl group. The presence of hydrogen in a position ortho to any hydroxyl group would render the compound non-hindered. Preferably the hydroxyl groups in polycyclic phenols are located ortho and/or para to Z. There can be one or more hydroxyl groups per phenyl nucleus, $y_1$, $y_2$ and $y_3$ representing the number thereof. Preferably, there will be only one hydroxyl group per phenyl nucleus.

$Q_1$, $Q_2$ and $Q_3$ can each contain from one to about 30 carbon atoms, and can be selected from among halogen, alkyl, aryl, alkaryl, alkenyl, aralkyl and cycloalkyl hydrocarbon groups, carboxy and acyl

wherein R' is aryl, alkyl or hydrogen) groups.

In the case of polycyclic phenols, the bivalent linking groups, $Z_1$ and $Z_2$ can be a single bond or an oxygen atom or an alkylene or alicyclidene or arylene or a mixed alkylene-alicyclidene or alkylene-arylidene group, having a straight or branched chain, whose total number of carbon atoms preferably ranges from one to about ten.

The sum of $y$ and $m$ in each ring cannot, of course, exceed five.

Typical Z groups are —CH$_2$—; —CH$_2$CH$_2$—; ———;

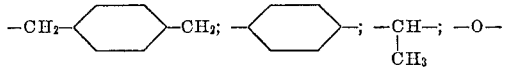

and

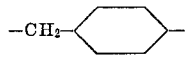

The various Z and Q groups are exemplified in the following compounds.

Exemplary monocyclic phenol compounds include 2,6-ditertiary butyl-p-cresol, 2,6-ditertiary butyl phenol, 2,4,6-tripropyl phenol, 2,4,5,6-tetradecyl phenol, 2,6-diisooctyl phenol, 2-methoxy-6-ethyl phenol, 6-benzoyl-o-cresol, 2,6-di - t - butyl-4-nitrophenol, 2,6-di-t-butyl-4-formylphenol, ethyl-4-hydroxy-3,5-di-t-butyl-alpha-cyanocinnamate, 2,6-di-t-butyl-4-methoxymethyl phenol.

Exemplary bicyclic phenol compounds include methylenebis-(2,6 - ditertiary butyl-m-cresol), methylenebis(2,6-ditertiary butyl phenol), 2,2$^1$ - methylenebis-(4-methyl-6,1$^1$-methylcyclohexyl phenol), 4,4$^1$-methylenebis-(2,6-diisopropyl phenol), 2,2$^1$ - dimethyl-6,6$^1$-di-t-butyl-4,4$^1$-biphenol, 2,2¹-methylenebis-(4-ethyl-6-t-butyl phenol), 2,2¹-methylenebis-(4-ethyl-6,1¹-methylcyclohexylphenol).

In place of the hindered phenol, a bis-phenol sulfide, which need not be hindered, can be employed in conjunction with the organotin compound. Such compounds can be described as bicyclic phenols in which the phenyl groups are linked to each other through a sulfur atom. They can be characterized by the formula:

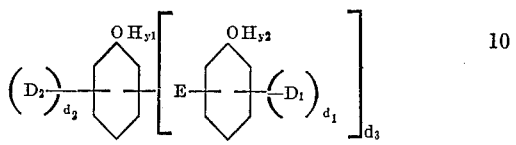

in which E is a bivalent sulfur-containing radical in which the sulfur atom is in the sulfide form. $D_1$ and $D_2$ are substituents on the phenyl groups and can be selected from among those groups indicated above as being satisfactory as $Q_1$ and $Q_2$ components and $D_1$ and $D_2$ can also contain

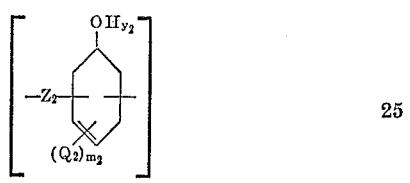

groups as above defined except that in this case, because of the sulfur linkage it is immaterial whether or not any of the phenolic hydroxyl groups in the bis-phenol sulfide are hindered. $d_1$ and $d_2$ are integers from zero to four and $d_3$ is an integer from one to six, preferably one. Representative E groups include

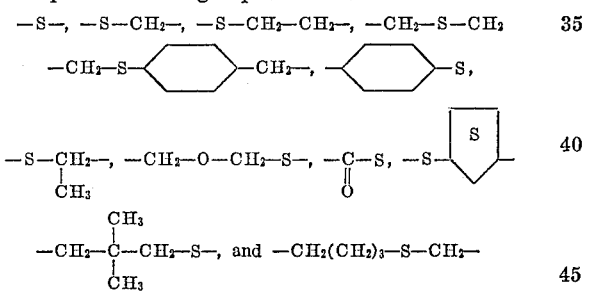

Representative bis-phenol sulfides include the following compounds

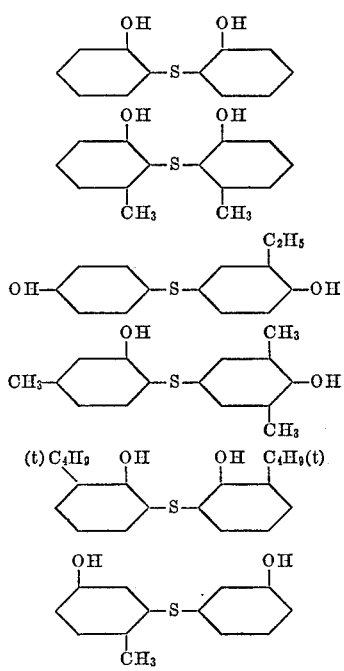

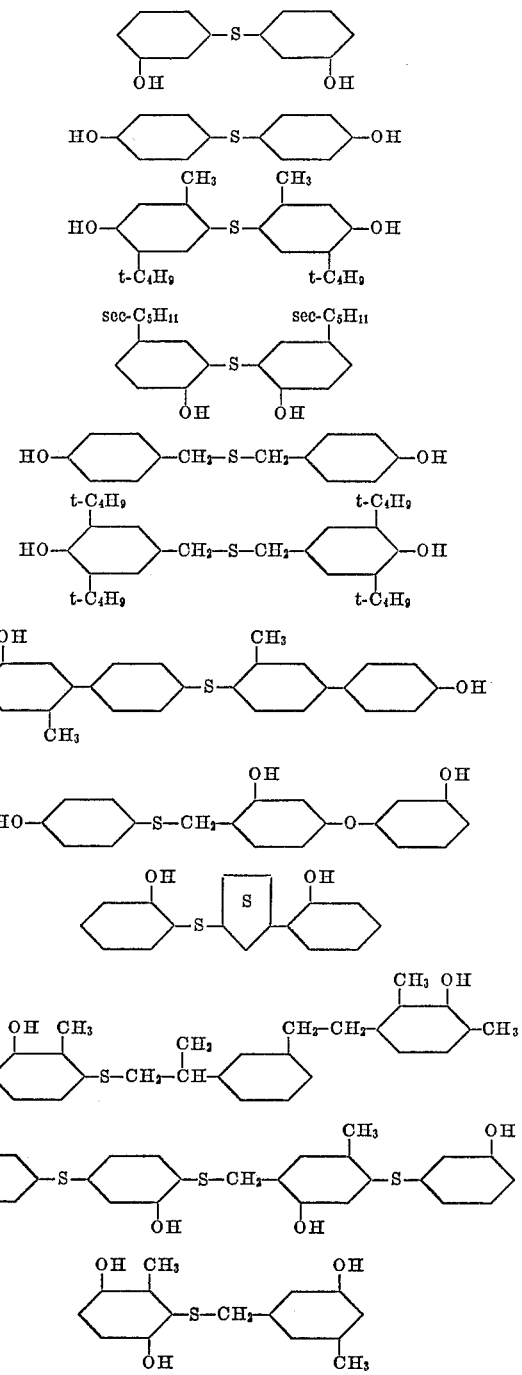

The stabilizing combination of this invention contains from about 0.001 to about 10 parts of phenol compound by weight per part of organotin compound. Preferably, there should be between about 0.002 to about 1 part by weight of phenol compound per part of organotin compound. The proportion of phenol compound to organotin compound employed in any given stabilizing combination of the invention within the range set forth is determined by the characteristics of the particular compounds and resins employed.

These stabilizing combinations, as has been indicated, are particularly effective stabilizers for rigid polyvinyl chloride resin compositions, that is, resin compositions which are formulated to withstand high temperatures of the order of 375° F. and higher. A small degree of plasticization of such polymers is permissible provided this does not reduce the softening point of the resin to below the temperature to which it must be subjected. Such partially plasticized but still rigid resin compositions do not contain more than about 10% by weight of plasticizer. Most rigid compositions generally contain no plasticizer at all.

The "polyvinyl chloride" as used herein is inclusive not only of vinyl chloride homopolymers of all types, but also of copolymers of vinyl chloride in a major proportion, and other copolymerizable monomers in minor proportion, such as copolymers of vinyl chloride and vinyl acetate, copolymers of vinyl chloride and vinylidene chloride, copolymers of vinyl chloride with maleic or fumaric acid esters and copolymers of vinyl chloride with styrene, and also mixtures of vinyl chloride homopolymer resins in a major proportion with a minor proportion of other synthetic resins, such a polyethylene, chlorinated polyethylene, or copolymers of acrylonitrile, butadiene and styrene. Among the polyvinyl chlorides which can be stabilized are the uniaxially-stretch-oriented polyvinyl chloride described in U.S. Patent No. 2,984,593 to Isaksem et al., that is, syndiotactic polyvinyl chloride. as well as atactic and isotactic polyvinyl chlorides.

The stabilizing combinations of this invention can, if desired, be employed in conjunction with other stabilizers for polyvinyl chloride resins, although, in most cases, the stabilization imparted by the combinations of this invention will be sufficient. In some cases, however, for particular end uses, special stabilization effects may be desired.

Polyvinyl chloride stabilized by means of this invention will typically contain from about 0.01 to about 2 parts of either the hindered phenol or the bis-phenol sulfide and from about 0.2 to about 10 parts of organotin compound, by weight per 100 parts of polyvinyl chloride resin. Preferably, there should be from about 0.01 to about 0.5 part of phenol compound and from about 0.5 to about 5 parts of organotin compound by weight per 100 parts of resin. The proportion of phenol compound to organotin compound employed in the stabilizing combination of the invention is determined by the characteristics of the particular compounds and resins employed. The higher the ultimate temperature to which the stabilized composition is to be subjected, the larger the amount of stabilizing combinaiton. More stabilizer combination can be used, but usually no better result is obtained, and therefore such amounts are uneconomical and wasteful.

A small amount, usually not more than 1.5% of a parting agent, also can be included. Typical parting agents are the higher aliphatic acids and salts having from twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

The preparation of the stabilized composition is easily accomplished by conventional procedures. The selected stabilizer combination ordinarily is blended with the polyvinyl chloride resin, using, for instance, plastic mixing rollers, at a temperature at which the mix is fluid and thorough blending facilitated, milling the stabilizer with the resin on a 2-roll mill at from 300 to 400° F. for a time sufficient to form a homogenous sheet, five minutes, usually. After the mass is uniform, it is sheeted off in the usual way.

The following examples in the opinion of the inventor represent preferred embodiments of polyvinyl chloride resin compositions of his invention and exhibit the synergistic effect obtained thereby.

Example I

A series of formulations was prepared having the following compositions—

Plastic composition:                Parts by weight
  Geon 103 Ep (homopolymer of polyvinyl chloride) _____ 150
  Mineral oil _____ 0.75
  Stabilizer as noted.

The stabilizer was added in proportion noted in Table I below and was blended with the polyvinyl chloride and the mixture was fused on a two-roll mill and then tested in an oven at 375° F. for heat stability. The discoloration and clarity were noted, and the color is reported in Table I below.

The results indicate that neither dibutyl tin-bis-(dipropylene glycol maleate) or 2,6-ditertiarybutyl-p-cresol, a hindered phenol, are particularly effective stabilizers for rigid polyvinyl chloride resins. However, when the two compounds are combined, as in Composition C, the stabilization afforded to rigid polyvinyl chloride resins is equal to or superior to that obtained through the use of a conventional sulfur-containing stabilizer, dibutyl tin dioctyl thioglycolate (Composition D) with the further advantage that Composition C did not have the odor characteristic of sulfur-containing compounds which was present in Composition D. After one hour of heating at 375° F., Sample C had not significantly darkened thus indicating its suitability under the standards conventionally employed for rigid polyvinyl chloride resin stabilizers.

TABLE I
(375° F)

| Time of Heating | Composition Number | | | |
|---|---|---|---|---|
| | A | B | C | D |
| | Stabilizing Composition | | | |
| | 4.5 parts dibutyl tin-bis-(dipropylene glycol maleate) | 0.1 part 2,6-di-t-butyl-p-cresol | 4.25 parts dibutyl tin-bis-(dipropylene glycol maleate) plus 0.1 part 2,6-di-ti-butyl-p-cresol | 4.5 parts dibutyl tin dioctyl thioglycolate |
| | Color | Color | Color | Color |
| Initial | Colorless | Colorless | Colorless | Colorless. |
| After 15 min | Pale Yellow | Red | Very Pale Yellow | Pale Yellow. |
| After 30 min | Yellow | Dark Brown | Pale Yellow | Do. |
| After 45 min | Brownish Yellow | Charred | do | Yellow. |
| After 60 min | Olive | do | Yellow | Do. |
| After 75 min | Brown | do | Brownish Yellow | Orange-Yellow. |
| After 90 min | Charred | do | do | Orange-Brown. |
| After 105 min | do | do | Brown | Brown. |
| After 120 min | do | do | Darker Brown | Deep Brown. |

Example II

The procedure of Example I was followed using different stabilizer combinations as noted in Table II. The color was noted and is indicated in Table II.

Plastic composition:                Parts by weight
  Geon 103 Ep _____ 150
  Mineral oil _____ 0.75
  2,6-di-t-butyl-p-cresol _____ 0.1
  Organotin compound as noted.

As in the case of Example I, this example indicates the superior stabilizing effects obtained by means of this invention. In addition to excellent stability to heat, the compositions of this example, being free from sulfur, did not suffer the disadvantage of an unpleasant odor. All of the compositions employed showed good stability after being heated for 1 hour at 375° F.

isooctyl maleate) and 0.1 part of 2,6-di-t-butyl-p-cresol. The resulting composition remained colorless for a substantial period of time and had not significantly darkened after one hour of heating at 375° F. indicating that the stabilizer combinations of this invention are also applicable to copolymers of vinyl chloride.

TABLE II
(375° F.)

| Time of Heating | Composition Number | | |
|---|---|---|---|
| | E | F | G |
| | Organotin Compound | | |
| | 5 parts di-n-octyl tin-bis-(dipropylene glycol monomaleate) | 4.15 parts tri-n-octyl tin monoisooctyl maleate | 4.5 parts dibutyl tin-bis-(monoisooctyl fumarate) |
| | Color | Color | Color |
| Initial | Colorless | Colorless | Colorless. |
| After 15 min | Pale Yellow | Pale Yellow | Very Pale Yellow. |
| After 30 min | Yellow | do | Pale Yellow. |
| After 45 min | Light Yellow | Light Yellow | Yellow. |
| After 60 min | Yellow | Yellow | Do. |
| After 75 min | Deep Yellow | Deep Yellow | Deep Yellow. |
| After 90 min | Olive | Light Olive | Do. |
| After 105 min | Brown | Brown | Olive. |
| After 120 min | Dark Brown | do | Brown Yellow. |

Example III

The procedure of Example I was followed, using different stabilizer combinations as noted in Table III. The color was noted and is indicated in Table III.

Plastic composition:     Parts by weight
    Geon 103 Ep _____ 150
    Mineral oil _____ 0.75
    Di-n-octyl tin-diisooctyl maleate _____ 4.2
    Hindered phenol compound as noted in Table III.

This example indicates that the synergistic effects obtained by means of the present invention are obtainable with other phenols containing inert substituents in the positions ortho to each hydroxyl group and that good stabilization is observable after heating for one hour at 375° F.

Example V

The procedure of Example I was repeated using, as the organotin compound, 5 parts of di-n-octyl-tin-bis-(dipropylene glycol monomaleate), and bis-phenol sulfides in amounts as indicated in Table IV.

The compositions were heated at 375° F. in accordance with the procedure of Example I, and results obtained are indicated in Table IV.

These results indicate that bis-phenol sulfides in which the phenyl groups are linked by means of a sulfur atom yield good stabilization when used in conjunction with an organotin compound of the type required in this invention, whether or not there are substituents ortho to each hydroxyl group. Thus, compositions Q and R are not sterically hindered with respect to the phenolic hydroxyl groups, whereas composition S is sterically hindered. It is

TABLE III
(375° F.)

| Time of Heating | Composition Number | | | |
|---|---|---|---|---|
| | L | M | N | P |
| | Organotin Compound | | | |
| | 0.2 part 2,6-di-t-butyl-4-formyl phenol | 0.25 part ethyl-4-hydroxy-3,5-di-t-butyl alpha cyano-cinnamate | 0.2 part 2,6-di-t-butyl-4-methoxymethyl phenol | 0.5 part 2,2' methylene bis-(4-methyl-6-1'-methyl cyclohexyl phenol) |
| | Color | Color | Color | Color |
| Initial | Colorless | Colorless | Colorless | Colorless. |
| After 15 min | Very Pale Yellow | Light Yellow | Pale Yellow | Pale Yellow. |
| After 30 min | do | Pale Yellow | do | Do. |
| After 45 min | Yellow | Yellow | Light Yellow | Light Yellow. |
| After 60 min | Deep Yellow | do | Yellow | Yellow. |
| After 75 min | Dark Olive | Dark Brown | Deep Yellow | Deep Yellow. |
| After 90 min | Dark Brown | do | Olive | Olive. |
| After 105 min | do | do | Brown | Do. |
| After 120 min | Dark Brown | do | do | Brown. |

Example IV

The procedure of Example I was repeated, using as the resin 127.5 parts of "Vinylite VYHH," a copolymer of 87% vinyl chloride and 13% vinyl acetate, and 22.5 parts of "Vinylite VYNS," a copolymer of 90% vinyl chloride and 10% vinyl acetate. The stabilizer combination employed was 4.0 parts of dibutyl tin bis-(mono-further noted that the results obtained by means of these bis-phenol sulfides are substantially equivalent to the results obtained with composition D, a conventional sulfur-containing organotin compound in providing relative stability after one hour of heating at 375° F. In addition, compositions Q, R and S did not have the unpleasant odor characteristic of sulfur compounds.

TABLE IV (375° F.)

| Time of Heating | Composition Number | | |
|---|---|---|---|
| | Q | R | S |
| | Phenol Compound | | |
| | 0.1 part 4,4″-thiobis-(2-t-butyl-5-methyl phenol) | 0.1 part 2,6″-thiobis-(4-methyl-3′-isopropyl phenol) | 0.1 part 2,6′-thiobis-(2′,5-t-butyl phenol) |
| | Color | Color | Color |
| Initial | Colorless | Colorless | Colorless. |
| After 15 min | Pale Yellow | Very Pale Yellow | Very Pale Yellow. |
| After 30 min | do | do | Pale Yellow. |
| After 45 min | Light Yellow | Pale Yellow | Yellow. |
| After 60 min | Yellow | Yellow | Do. |
| After 75 min | Deep Yellow | Deep Yellow | Deep Yellow. |
| After 90 min | Light Olive | Dark Olive | Olive. |
| After 105 min | Brown | Dark Brown | Do. |
| After 120 min | do | do | Brown. |

Example VI

A polyvinyl chloride polymer formulation was prepared having the following composition.

Plastic compostion: Parts by weight
- Geon 103 Ep (homopolymer of polyvinyl chloride) _____ 120
- DuPont LD 313 (a chlorinated polyethylene containing approximately 38% chlorine) ___ 30
- Isooctyl epoxystearate _____ 5

The composition was then divided into two equal parts, identified as compositions T and U. To composition T, 4.2 parts of dibutyl tin-(bis-isooctylmaleate) and 0.1 part of 2,6-di-t-butyl-p-cresol were added. To composition U. 4.5 parts of dibutyl tin bis-isooctyl thioglycolate were added.

Both compositions, which were colorless, were then heated at 375° F. for one hour. At the end of this time, both compositions were substantially identical in their yellow color. Composition U gave off an unpleasant odor characteristic of sulfur compounds whereas composition T, employing the stabilizer combination of this invention, was substantially odorless.

This example illustrates the fact that the invention is applicable to mixtures of polymers in which polyvinyl chloride is predominant. It also illustrates the use of a minor proportion of a supplemental stabilizer along with the stabilizer combination of the invention. In this example, the supplemental stabilizer was isooctyl epoxystearate.

The term "inert substituent" as used in the claims refers to any substituent inert to polyvinyl chloride and to the organotin compound, and is inclusive of such substituents containing additional phenolic hydroxyl groups, of the type, for example, disclosed in column 6.

I claim:

1. A rigid polyvinyl chloride resin composition containing less than about 10% by weight of a plasticizer, and having increased resistance to deterioration when heated at 375° F. consisting essentially of (a) a rigid polyvinyl chloride polymer resin, (b) an amount within the range from about 0.2 to about 10 parts by weight per 100 parts of polyvinyl chloride resin of an organotin compound in which tin is in a tetravalent state having organic radicals linked to tin only through carbon and oxygen, at least two organic radicals being linked through carbon, and at least one organic radical being linked through oxygen to a carboxyl group of an unsaturated aliphatic dicarboxylic acid ester of an alcohol having from one to two hydroxyl groups, and (c) an amount within the range from about 0.01 to about 2 parts by weight per 100 parts of polyvinyl chloride resin of a hindered phenol having an inert substituent in each position ortho to each phenolic hydroxyl group, to enhance the stabilizing effect of the organotin compound.

2. A composition in accordance with claim 1 wherein the dicarboxylic acid is maleic acid.

3. A composition in accordance with claim 1 wherein the dicarboxylic acid is fumaric acid.

4. A composition in accordance with claim 1 wherein the hindered phenol has a tertiary butyl group in each position ortho to each phenolic hydroxyl group.

5. A composition in accordance with claim 4 wherein the phenol compound is 2,6-ditertiary-butyl-p-cresol.

6. A composition in accordance with claim 1 wherein the polyvinyl chloride resin is a homopolymer of vinyl chloride.

7. A composition in accordance with claim 1 wherein the polyvinyl chloride polymer is a copolymer of vinyl chloride.

8. A composition as in claim 1 wherein the polyvinyl chloride resin is comprised of a major proportion of vinyl chloride homopolymer and a minor proportion of chlorinated polyethylene.

9. A rigid polyvinyl chloride resin composition as in claim 1 wherein the organotin compound is dibutyltin-bis-(dipropylene glycol maleate) and the phenol compound is 2,6-ditertiary-butyl-p-cresol.

10. A rigid polyvinyl chloride resin composition as in claim 1 wherein the dicarboxylic acid is maleic acid or fumaric acid and the phenol compound is 2,6-ditertiary-butyl-p-cresol.

11. A rigid polyvinyl chloride resin composition containing no plasticizer and having increased resistance to deterioration when heated at 375° F., consisting essentially of (a) a rigid polyvinyl chloride resin, (b) an organotin compound having organic radicals linked to tin only through carbon and oxygen, at least two organic radicals being liked through carbon, and at least one organic radical being linked through oxygen to a carboxyl group of an unsaturated aliphatic dicarboxylic acid ester of an alcohol having from one to two hydroxyl groups, and (c) a phenol compound from the group consisting of phenols other than bisphenol sulfides having an inert substituent at each position ortho to each phenolic hydroxyl group and bisphenol sulfides, said phenol compound being present in an amount to enhance the stabilizing effect of the organotin compound.

(References on following page)

References Cited

UNITED STATES PATENTS

| | | | |
|---|---|---|---|
| 2,307,092 | 1/1943 | Yngve | 260—45.75 |
| 2,625,521 | 1/1953 | Fischer et al. | 260—45.75 |
| 2,631,990 | 3/1953 | Mack | 260—45.75 |
| 2,985,617 | 5/1961 | Salyer | 260—45.85 |
| 3,019,247 | 1/1962 | Mack et al. | 260—45.75 |
| 3,067,259 | 12/1962 | Bailey | 260—45.75 |

FOREIGN PATENTS

| | | |
|---|---|---|
| 1,278,814 | 11/1961 | France. |
| 921,968 | | Great Britain. |

DONALD E. CZAJA, *Primary Examiner.*

LEON J. BERCOVITZ, J. R. LIEBERMAN, *Examiners.*

G. W. RAUCHFUSS, D. K. WEDDING,
*Assistant Examiners.*

UNITED STATES PATENT OFFICE
CERTIFICATE OF CORRECTION

Patent No. 3,385,818                                            May 28, 1968

Otto S. Kauder

It is certified that error appears in the above identified patent and that said Letters Patent are hereby corrected as shown below:

Column 1, line 26, "2,726,27" should read -- 2,726,227 --; line 36, "2,883,368" should read -- 2,883,363 --; line 40, "radiacls" should read -- radicals --. Column 2, line 19, "move" should read -- more --. Column 3, lines 56 to 60, formula 1 should appear as shown below:

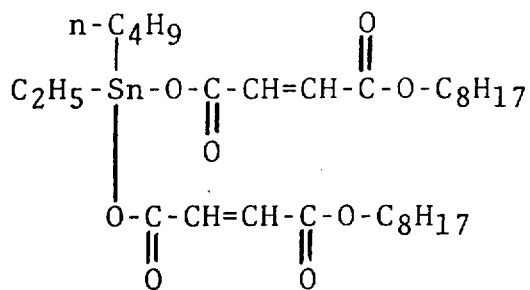

same column 3, lines 63 to 67, formula 2 should appear as shown below:

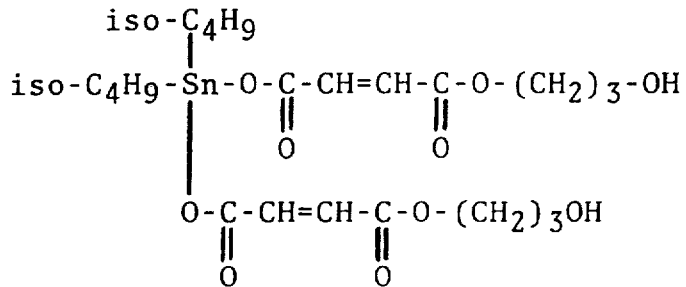

Column 4, line 28, the upper portion of formula 8 should appear as shown below:

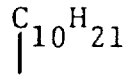

Column 6, lines 3 to 10, the upper portion of the second benzene ring should appear as shown below:

3,385,818

(2)

same column 6, line 26, "y₉" should read -- $y_3$ --; line 46, after "-O-" insert a semicolon; lines 49 to 52,

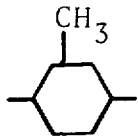     should read     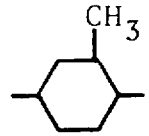

same column 6, lines 54 to 56,

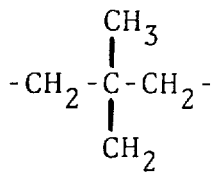     should read     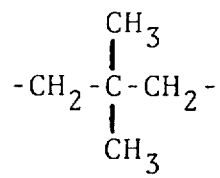

Column 7, line 35, after "-CH₂-S-CH₂" insert a comma; line 44, after "-CH₂(CH₂)₃-S-CH₂-" insert a period. Columns 9 and 10, TABLE I, column C, that portion of the heading reading "plus 0.1 part 2,6-di-ti-butyl-" should read -- plus 0.1 part 2,6-di-t-butyl- --. Columns 11 and 12, TABLE III, first column, line 6 thereof, "After i5 min" should read -- After 75 min --. Columns 13 and 14, TABLE IV, column Q, that portion of the heading reading "0.1 part 4,4″-thiobis-(2-t-butyl-5-" should read -- 0.1 part 4,4′-thiobis-(2-t-butyl-5- --; same table, column R, that portion of the heading reading "0.1 part 2,6″-thiobis-(4-methyl-3′-" should read -- 0.1 part 2,6′-thiobis-(4-methyl-3′- --. Column 13, line 40, "U." should read -- U, --. Column 14, line 64, "liked" should read -- linked --.

Signed and sealed this 9th day of June 1970.

(SEAL)
Attest:

EDWARD M. FLETCHER, JR.
Attesting Officer

WILLIAM E. SCHUYLER, JR.
Commissioner of Patents